(12) United States Patent
Hsu

(10) Patent No.: US 6,872,272 B2
(45) Date of Patent: Mar. 29, 2005

(54) VEHICLE TIRE

(76) Inventor: Shut Chen Hsu, No. 7 Alley 1, Lane 163, Sec. 3, Nung-Chuan Rd., I Lan City (TW)

( * ) Notice: Subject to any disclaimer, the term of this patent is extended or adjusted under 35 U.S.C. 154(b) by 205 days.

(21) Appl. No.: 10/394,180

(22) Filed: Mar. 24, 2003

(65) Prior Publication Data

US 2004/0187994 A1 Sep. 30, 2004

(30) Foreign Application Priority Data

Feb. 18, 2003 (TW) ........................................ 92103349 A

(51) Int. Cl.$^7$ .............................................. B29D 30/08
(52) U.S. Cl. ..................... 156/123; 152/520; 156/130.7; 156/133; 264/326
(58) Field of Search ................................ 156/123, 133, 156/130.7, 110.1, 135; 152/520, 516, 523, 158, 454; 264/326

(56) References Cited

U.S. PATENT DOCUMENTS

| | | | | |
|---|---|---|---|---|
| 2,021,500 A | * | 11/1935 | De Vita ....................... | 152/158 |
| 2,028,601 A | * | 1/1936 | Hall ............................ | 152/400 |
| 3,380,872 A | * | 4/1968 | Pouilloux .................... | 156/416 |
| 3,610,308 A | * | 10/1971 | McDonald ................... | 152/158 |
| 5,591,288 A | * | 1/1997 | Becker et al. ............. | 156/130.7 |
| 6,488,797 B1 | * | 12/2002 | Kirby .......................... | 156/131 |

\* cited by examiner

Primary Examiner—Geoffrey L. Knable
(74) Attorney, Agent, or Firm—Rosenberg, Klein & Lee

(57) ABSTRACT

A vehicle tire fabrication method in which a raw tire tube is adhered with two annular hook members and two annular rubber packing members one the inside and an airtight sealing layer and a combination outer tire wall layer on the outside, and then the raw tire thus obtained is put in a vulcanizing mold and vulcanized into a finished vehicle tire, and then the annular rubber packing members are removed from the finished vehicle tire.

2 Claims, 6 Drawing Sheets

VEHICLE TIRE

BACKGROUND OF THE INVENTION

1. Field of the Invention

The present invention relates to vehicle tires and, more particularly, to a vehicle tire fabrication method, which uses a conventional tire fabrication equipment to make a vehicle tire having integrated hook members for holding a spare tire on the inside.

2. Description of the Related Art

For a safety driving, the condition of vehicle tires must be regularly checked. There is known a vehicle tire having an annular hook member on the inside for holding a spare tire so that the vehicle tire can keep running for a certain length of time when exploded or upon an air leakage. This design is functional, however, the fabrication of this design of vehicle tire requires special fabrication equipment.

SUMMARY OF THE INVENTION

The present invention has been accomplished under the circumstances in view. It is the main object of the present invention to provide a vehicle tire fabrication method, which uses a conventional tire fabrication equipment to make a vehicle tire having integrated hook members for holding a spare tire on the inside. According to the present invention, the vehicle tire fabrication method comprises the steps of: (A) preparing a raw tire tube having two smoothly arched angles bilaterally disposed on the inside; (B) adhering two annular hook members and two annular rubber packing members to the smoothly arched angles of said raw tire tube and keeping said annular hook members respectively supported on said annular rubber packing members abutted against each other; (C) adhering an airtight sealing layer to the outside wall of said raw tire tube; (D) fixedly fastening a combination outer tire wall layer to the outer surface of said airtight sealing layer so as to obtain a raw tire; (E) putting said raw tire in a vulcanizing mold between a top die and a bottom die, and then putting a vulcanizing bladder into the inside of said raw tire and inflating said vulcanizing bladder by applying a compressed gas of high temperature to the inside of said vulcanizing bladder for causing said raw tire to be vulcanized into a desired finished vehicle tire; and (F) removing said annular rubber packing members from the finished vehicle tire.

DETAILED DESCRIPTION OF THE PREFERRED EMBODIMENT

Figure 1:
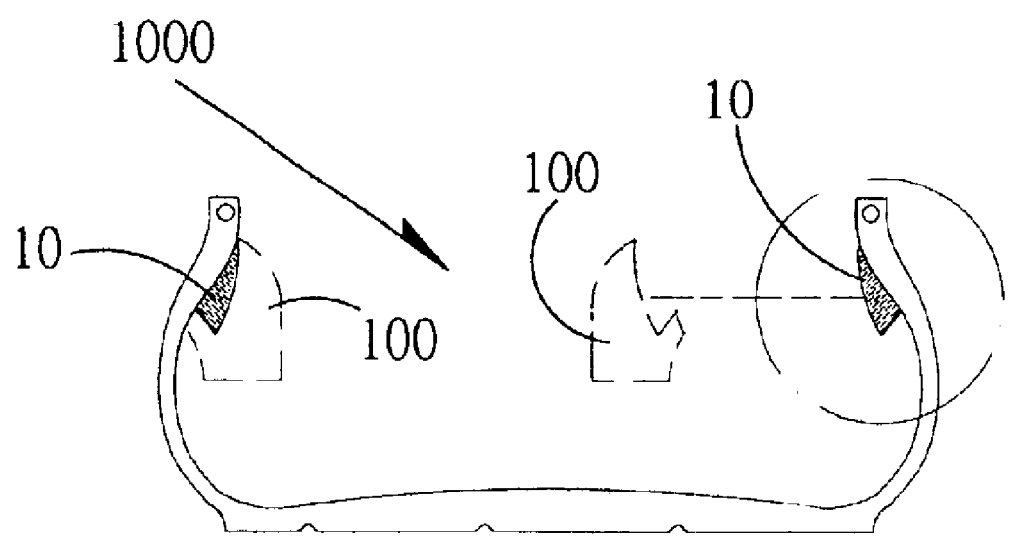
FIG. 1 is a schematic drawing showing the structure of a vehicle tire according to the present invention.

Referring to FIG. 1, a vehicle tire 1000 is shown comprising integrated annular hook members 10 on the inside for holding a spare tire body 100.

Figure 2:
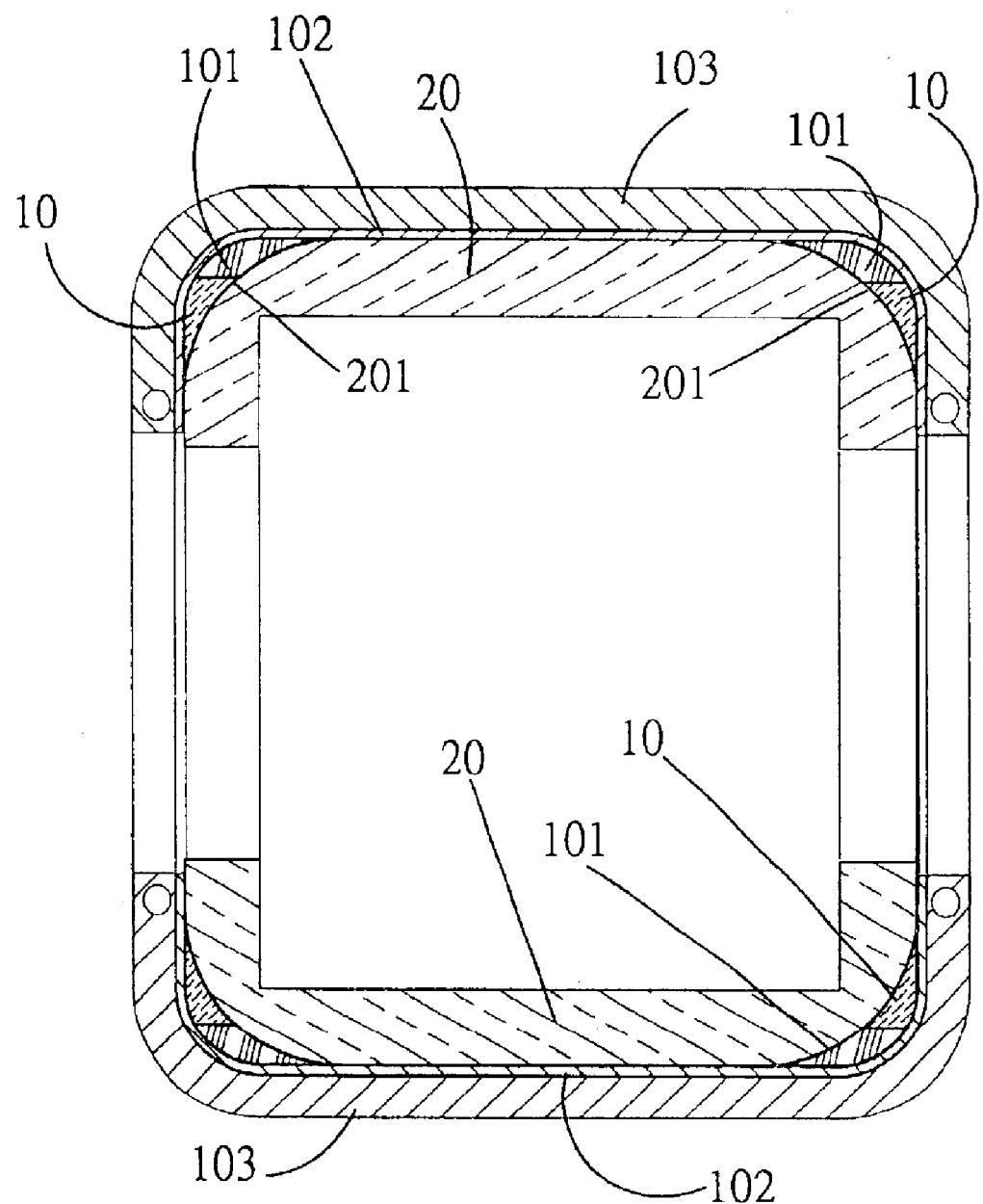
FIG. 2 is a sectional view showing the structure of a raw tire according to the present invention.

Referring to FIG. 2, a raw tire tube 20 is prepared having two smoothly arched angles 201 bilaterally disposed on the inside. Two annular hook members 10 and two annular rubber packing members 101 are respectively fastened to the smoothly arched angles 201 of the raw tire tube 20 and abutted against each other. Thereafter, an airtight sealing layer 102 is adhered to the outside wall of the raw tire tube 20, and then a combination outer tire wall layer 103 (including the carcass, breaker, tread, sidewall, etc., that are prepared from different rubber mixtures containing natural rubber, synthetic rubber, carbon ash, sulfur, resin, and other additives) is covered on the outer surface of the airtight sealing layer 102, forming a raw tire 104. The annular rubber packing members 101 are adapted to support the annular hook members 10 for further vulcanizing shape-forming, not compatible to the annular hook members 10 and the combination outer tire wall layer 103.

Figure 3:
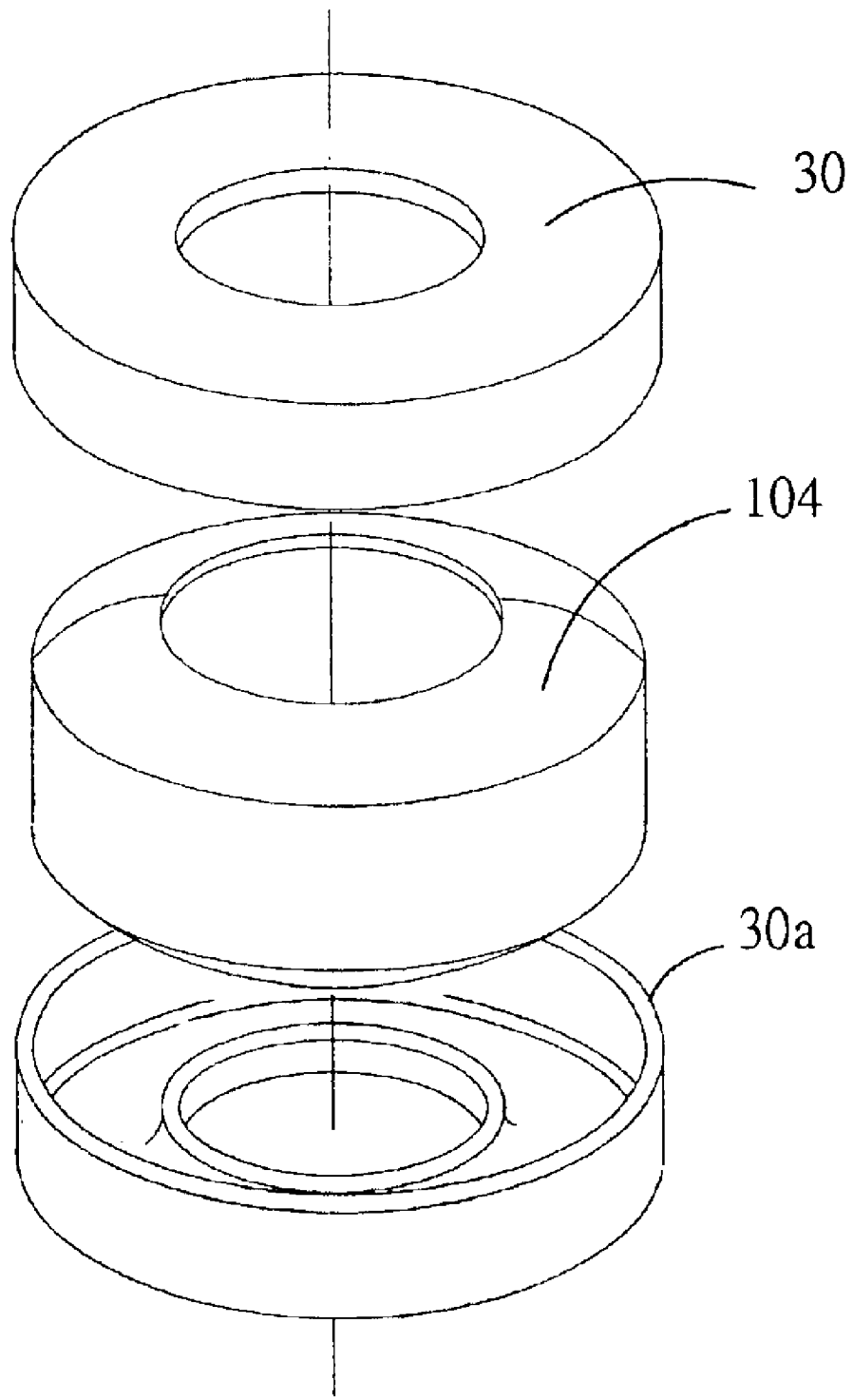
FIG. 3 an exploded view of a raw tire, a top tie, and a bottom tie according to the present invention.
Figure 4:
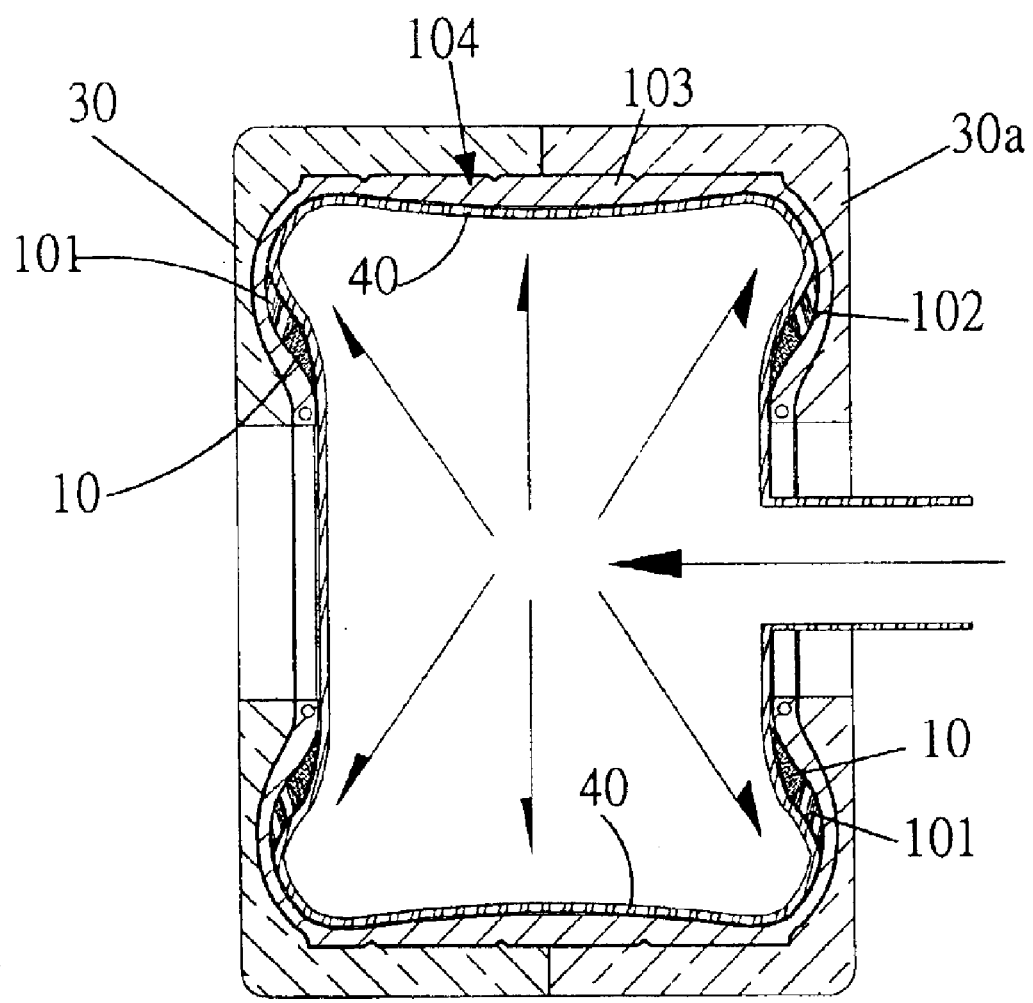
FIG. 4 is a schematic drawing showing the vulcanizing process of the raw tire in a vulcanizing mold according to the present invention.
Figure 5:
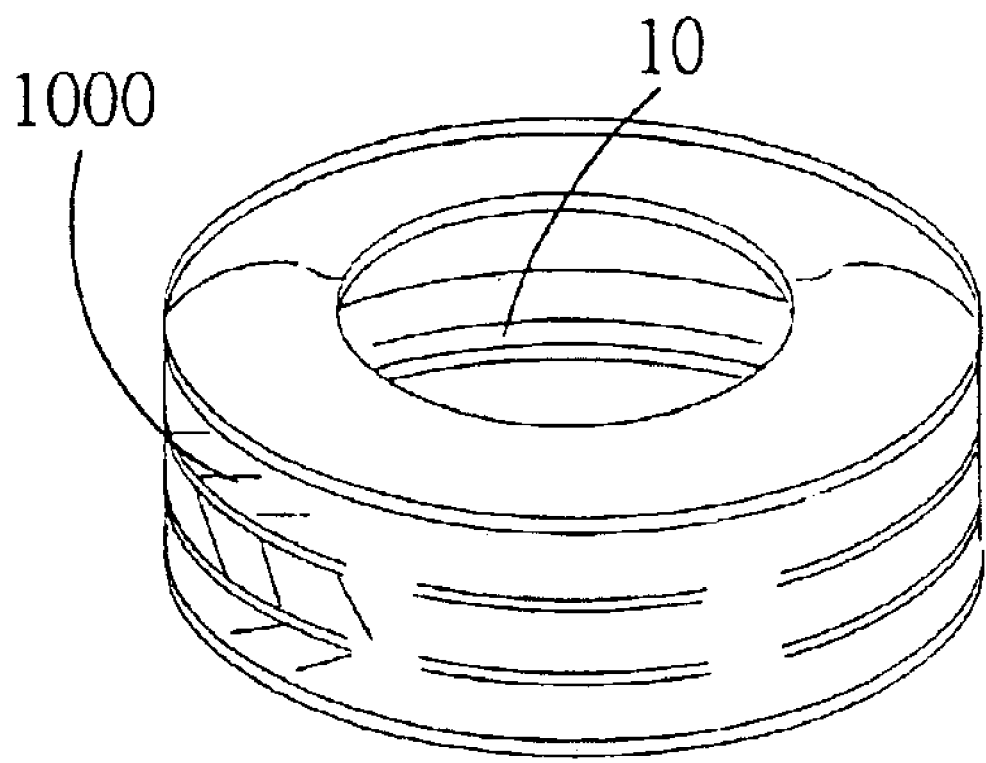
FIG. 5 is an elevational view of a finished vehicle tire according to the present invention.
Figure 6:
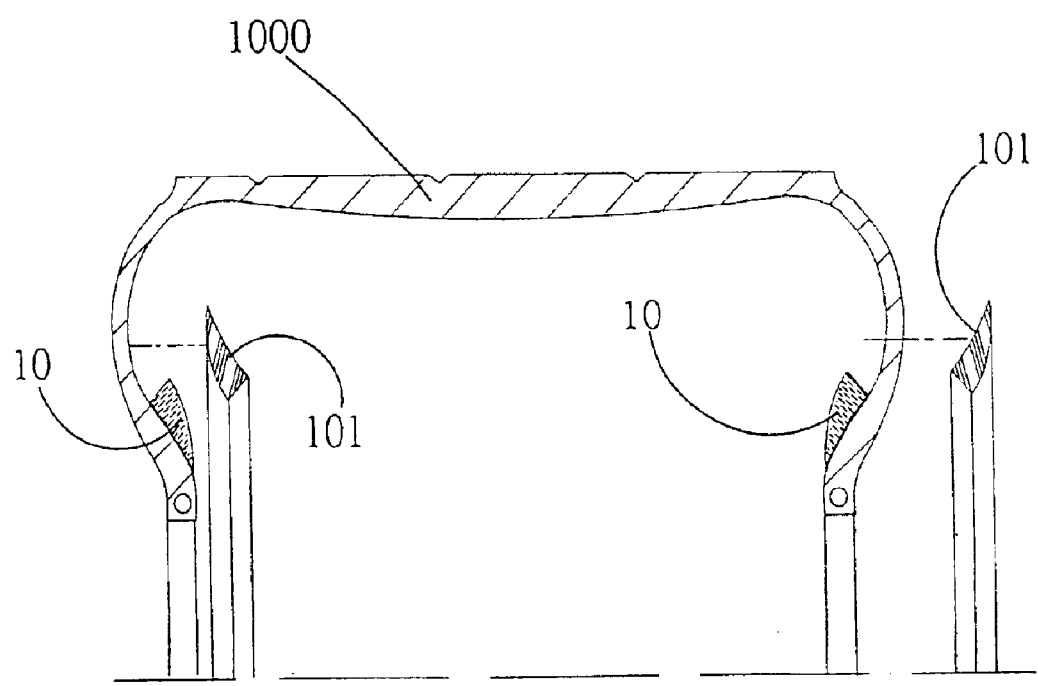
FIG. 6 is a schematic drawing showing removal of the annular rubber packing members from the finished vehicle tire according to the present invention.

The raw tire 104 is then put in a vulcanizing mold between the top die 30 and the bottom die 30a (see FIG. 3), and then a compressed gas of high temperature is applied to a vulcanizing bladder 40 been put inside the raw tire 104 (see FIG. 4), thereby causing the vulcanizing bladder 40 to be inflated and pressed on the inside wall of the raw tire 104 against the top and bottom dies 30 and 30a. When vulcanized, the raw tire 104 is formed into the desired finished vehicle tire 1000 having integrated annular hook members 10 (see FIG. 5) Because the annular rubber packing members 101 are not compatible to the annular hook members 10 and the combination outer tire wall layer 103, they can easily be removed from the finished vehicle tire 1000 (see FIG. 6).

It is to be understood that the drawings are designed for purposes of illustration only, and are not intended for use as a definition of the limits and scope of the invention disclosed.

What the invention claimed is:

1. A vehicle tire fabrication method comprising the steps of: (A) preparing a raw tire tube having two smoothly arched angles bilaterally disposed on the inside; (B) adhering two annular hook members and two annular rubber packing members to the smoothly arched angles of said raw tire tube and keeping said annular hook members respectively supported on said annular rubber packing members abutted against each other; (C) adhering an airtight sealing layer to the outside wall of said raw tire tube; (D) fixedly fastening a combination outer tire wall layer to the outer surface of said airtight sealing layer so as to obtain a raw tire; (E) putting said raw tire in a vulcanizing mold between a top die and a bottom die, and then putting a vulcanizing bladder into the inside of said raw tire and inflating said vulcanizing bladder by applying a compressed gas of high temperature to the inside of said vulcanizing bladder for causing said raw tire to be vulcanized into a finished vehicle tire; and (F) removing said annular rubber packing members from the finished vehicle tire.

2. The vehicle tire fabrication method as claimed in claim 1, wherein the material of said annular rubber packing members is not compatible to said annular hook members and said combination outer tire wall layer.

* * * * *